(12) United States Patent
Miao et al.

(10) Patent No.: US 8,670,722 B2
(45) Date of Patent: Mar. 11, 2014

(54) AUTOMATIC DETECTION OF ERRONEOUS CONNECTIONS BETWEEN ANTENNA PORTS AND RADIO FREQUENCY PATHS

(75) Inventors: Qingyu Miao, Beijing (CN); Mikael Coldrey, Landvetter (SE); Zhiheng Guo, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 133 days.

(21) Appl. No.: 13/321,076

(22) PCT Filed: May 20, 2009

(86) PCT No.: PCT/SE2009/050583
§ 371 (c)(1),
(2), (4) Date: Nov. 17, 2011

(87) PCT Pub. No.: WO2010/134861
PCT Pub. Date: Nov. 25, 2010

(65) Prior Publication Data
US 2012/0064838 A1  Mar. 15, 2012

(51) Int. Cl.
*H04B 17/00* (2006.01)
(52) U.S. Cl.
USPC .................................. 455/67.11; 455/63.1
(58) Field of Classification Search
USPC .............. 455/63.1, 67.11, 562.1, 575.7
See application file for complete search history.

(56) References Cited

U.S. PATENT DOCUMENTS

| 5,867,123 | A | 2/1999 | Geyh et al. |
| 6,437,577 | B1 | 8/2002 | Fritzmann et al. |
| 7,103,377 | B2 * | 9/2006 | Bauman et al. ............. 455/522 |
| 7,539,509 | B2 * | 5/2009 | Bauman et al. ............. 455/522 |
| 7,546,138 | B2 * | 6/2009 | Bauman ..................... 455/524 |
| 7,561,878 | B2 * | 7/2009 | Tam et al. .................. 455/425 |
| 7,917,177 | B2 * | 3/2011 | Bauman .................... 455/562.1 |
| 7,965,991 | B2 * | 6/2011 | Nash et al. ................ 455/115.2 |
| 8,412,106 | B2 * | 4/2013 | da Silva et al. ............ 455/63.4 |
| 2003/0198305 | A1 * | 10/2003 | Taylor et al. ............... 375/341 |
| 2004/0224637 | A1 * | 11/2004 | Silva et al. ................ 455/63.4 |
| 2006/0214837 | A1 * | 9/2006 | Liu et al. .................... 342/52 |
| 2008/0316990 | A1 * | 12/2008 | Steer et al. .................. 370/338 |
| 2009/0051591 | A1 | 2/2009 | Nakajima et al. |

FOREIGN PATENT DOCUMENTS

| CN | 101154977 A | 4/2008 |
| DE | 19923729 A1 | 11/2000 |
| JP | 2006115267 A | 4/2006 |
| JP | 2008035286 A | 2/2008 |
| WO | 0040050 A1 | 7/2000 |
| WO | 0102871 A1 | 1/2001 |

* cited by examiner

Primary Examiner — Lewis West
(74) Attorney, Agent, or Firm — Coats and Bennett PLLC

(57) ABSTRACT

A device (110) receives consecutive negative acknowledgments (NACKs) (540), measures a downlink channel quality (530) associated with the device (110), and triggers autonomous retransmission (430) when power is limited in the device (110), when the device (110) is using a minimum usable enhanced dedicated channel (E-DCH) transport format combination (ETFC), and when one of a number of consecutive NACKs (540) is greater than a predefined number, or the measured downlink channel quality (530) is less than a predefined threshold.

22 Claims, 12 Drawing Sheets

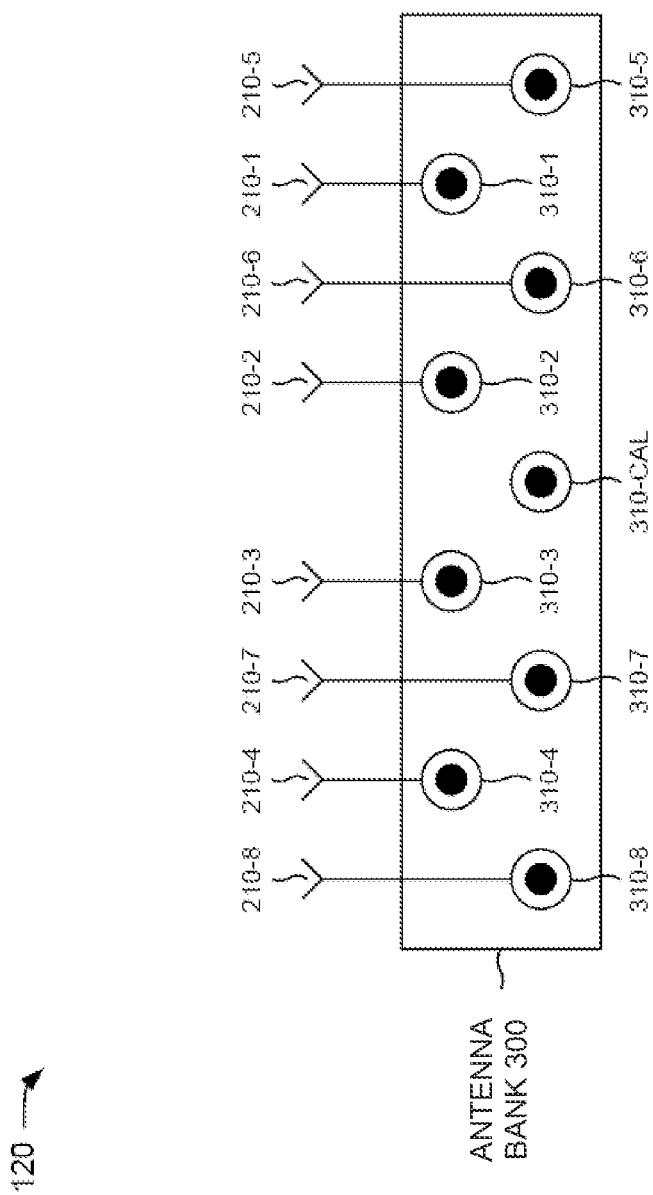

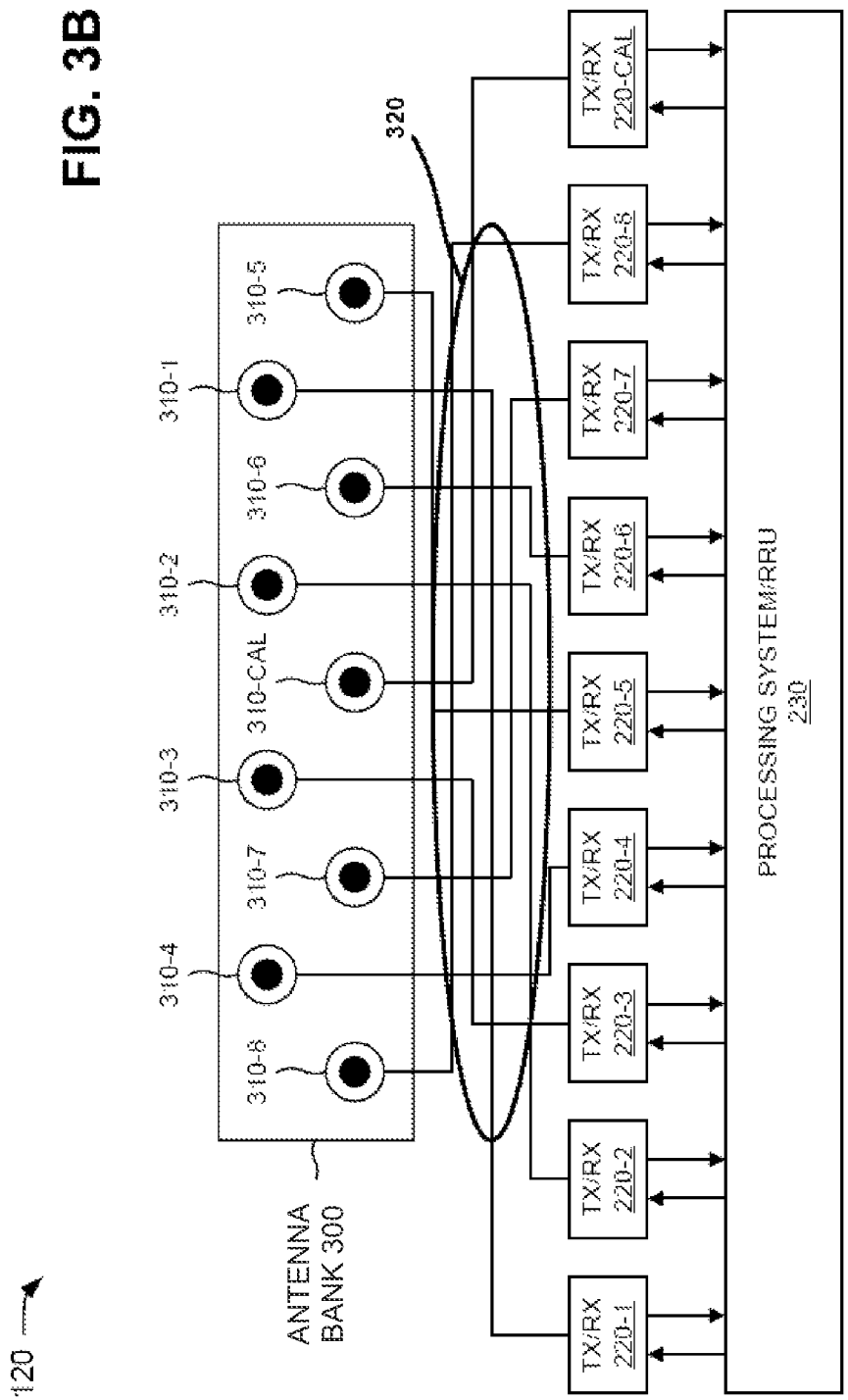

AUTOMATIC DETECTION OF ERRONEOUS CONNECTIONS BETWEEN ANTENNA PORTS AND RADIO FREQUENCY PATHS

TECHNICAL FIELD

Embodiments described herein relate generally to wireless communication systems, and more particularly, to automatic detection of erroneous connections between antenna ports and radio frequency (RF) paths.

BACKGROUND

Smart antennas (also known as adaptive array antennas, a multi-antenna system, multiple antennas, and multiple input, multiple output (MIMO) antennas) may be used with wireless communication devices, such as base stations (also referred to as "Node Bs"). Smart antennas are antenna arrays with smart signal processing algorithms that are used to identify spatial signal information (e.g., a direction of arrival (DOA) of the signal) and to calculate beamforming vectors. The beamforming vectors are used to track and locate an antenna beam associated with a target user equipment (e.g., a mobile telephone).

Smart antennas have two main functions—DOA estimation and beamforming. During generation of a beam, each smart antenna uses weights for beamforming. Different antennas may have different weights and may transmit different data. Current time division-synchronous code division multiple access (TD-SCDMA) based devices (e.g., base stations) may include four to eight antennas. Each antenna is connected, via a cable, to the base station (e.g., a radio base station (RBS) or a remote radio unit (RRU)). In such an arrangement, if a cable is connected to an incorrect antenna, an incorrect beam is generated and performance is decreased. However, manually checking incorrect or erroneous connections is time consuming and tedious.

One proposed solution to this problem is to automatically detect an incorrect connection between an antenna port and a RF path. In the proposed solution, an uplink-received signal is collected and a channel is detected. The channel can be detected with the uplink-received signal. The uplink-received signal is used to detect a maximum energy by traveling in all possible orders of an antenna array vector and in all possible spatial directions. Specifically, the uplink-received signal is used to calculate a correlation matrix, and all possible arrangements of an antenna weighting factor sequence are traversed to obtain a weighting factor matrix. After searching through all directions of space, a maximum value of different weighting factor arrangements is determined, and an arrangement corresponding to the maximum received power is chosen to be a current connection order. However, the proposed solution requires an uplink signal, which means that the proposed solution can only be used with an operational wireless communication network or with extra equipment that generates the uplink signal.

SUMMARY

It is an object of the invention to overcome at least some of the above disadvantages and to automatically detect a connection error with a base station (or a RRU) without the need for an operational wireless communication network or extra equipment that generates an uplink signal.

Embodiments described herein may automatically detect a connection error in a smart antenna (e.g., of a base station or a RRU) by measuring an amplitude and/or a phase between antenna ports of the smart antenna. In one embodiment, for example, in order to transmit and receive signals accurately, every antenna element, RF cable, and transceiver making up the smart antenna may need to operate identically. This means that every transmitting and receiving link may need to have the same amplitude and phase response. The base station may automatically implement a smart antenna calibration procedure that includes compensating the amplitude and phase of each transmitting and receiving link.

During antenna calibration, the base station (or the RRU) may measure amplitude and phase of an impulse response of a circuit between an antenna port and a calibration port. The base station (or the RRU) may also measure the amplitude and phase between any two antenna ports. A smart antenna vendor may provide a table that includes amplitude and phase information between any two antenna ports of the smart antenna. The base station (or the RRU) may compare the values provided in the antenna vendor's table with the measured amplitude and phase between two antenna ports. If there is a large difference between the table values and the measured values, the base station (or the RRU) may determine that there is an antenna connection error.

In an exemplary embodiment, a base station may determine an amplitude and/or phase between antenna elements of the base station, and may measure, based on the determined amplitude/phase, an amplitude/phase between corresponding antenna ports of the base station. The base station may compare the measured amplitude/phase with an expected amplitude/phase of the antenna ports to determine an error, and may compare the determined error to a threshold. The base station may determine an erroneous antenna port connection when the error exceeds the threshold, and may determine a correct antenna port connection when the error is less than or equal to the threshold.

In another exemplary embodiment, the base station may determine a squared error between the measured amplitude/phase and the expected amplitude/phase, and may compare the squared error to the threshold to determine whether the squared error is greater than the threshold and zero or whether the squared error is less than or equal to the threshold.

In another exemplary embodiment, the base station may receive antenna port permutations for multiple antenna ports of the base station, and may receive expected value information associated with the multiple antenna ports. The base station may calculate expected values for different antenna port permutations based on the received information, and may acquire measured values associated with the different antenna port permutations. The base station may compare the expected values for the different antenna port permutations with the measured values for the different antenna port permutations to determine errors for the different antenna port permutations, and may determine an optimal antenna port permutation to be one of the different antenna port permutations with the smallest determined error.

Such an arrangement may ensure that connection errors are automatically and easily detected, and that performance issues, due to connection errors, are minimized. The arrangement may not require an uplink signal, and thus may not require an operational wireless communication network or extra equipment to generate an uplink signal.

BRIEF DESCRIPTION OF THE DRAWINGS

FIGS. 3A and 3B depict diagrams of further exemplary components of the base station illustrated in FIG. 1;

DETAILED DESCRIPTION

The following detailed description refers to the accompanying drawings. The same reference numbers in different drawings may identify the same or similar elements. Also, the following detailed description does not limit the invention.

Embodiments described herein may automatically detect a connection error in a smart antenna (e.g., of a base station or a RRU) by measuring an amplitude and/or a phase between antenna ports of the smart antenna and by comparing the measured amplitude/phase to an expected amplitude/phase. The automatic detection techniques described herein may be used to quickly and easily detect connection errors in a smart antenna, and may prevent performance problems due to connection errors.

Figure 1:
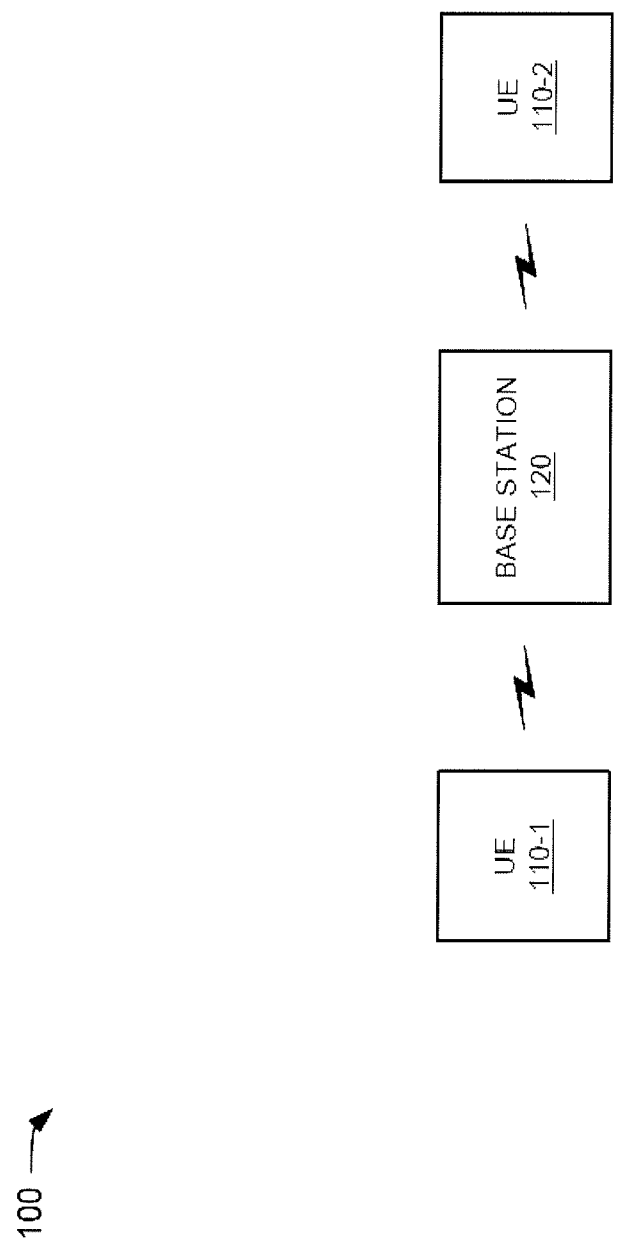
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include two user equipment (UEs) 110-1 and 110-2 (referred to collectively, and in some instances individually, as "user equipment 110") and a base station 120. Two pieces of user equipment 110 and a single base station 120 have been illustrated in FIG. 1 for simplicity. In practice, there may be more UEs 110 and/or base stations 120. Also, in some instances, a component in network 100 (e.g., one or more of user equipment 110 and/or base station 120) may perform one or more functions described as being performed by another component or group of components in network 100.

User equipment 110 may include one or more devices capable of sending/receiving voice and/or data to/from base station 120. In one embodiment, user equipment 110 may include, for example, a wireless telephone, a personal digital assistant (PDA), a laptop computer, etc. User equipment 110 may receive information from base station 120, and may generate and provide information to base station 120.

In one embodiment, base station 120 (also referred to as a "Node B") may be associated with a radio access network (RAN) (not shown). The RAN may include one or more devices for transmitting voice and/or data to user equipment 110 and a core network (not shown). The RAN may include a group of base stations 120 and a group of radio network controllers (RNCs). The RNCs may include one or more devices that control and manage base station 120. The RNCs may also include devices that perform data processing to manage utilization of radio network services. The RNCs may transmit/receive voice and data to/from base station 120, other RNCs, and/or the core network.

A RNC may act as a controlling radio network controller (CRNC), a drift radio network controller (DRNC), or a serving radio network controller (SRNC). A CRNC may be responsible for controlling the resources of base station 120. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

Base station 120 may include one or more devices that receive voice and/or data from the RNCs (not shown) and transmit that voice and/or data to user equipment 110 via an air interface. Base station 120 may also include one or more devices that receive voice and/or data from user equipment 110 over an air interface and transmit that voice and/or data to the RNCs or other user equipment 110.

In one embodiment, base station 120 may determine an amplitude and/or phase between antenna elements of base station 120, and may measure, based on the determined amplitude/phase, an amplitude/phase between corresponding antenna ports of base station 120. Base station 120 may compare the measured amplitude/phase with an expected amplitude/phase of the antenna ports to determine an error, and may compare the determined error to a threshold. Base station 120 may determine an erroneous antenna port connection when the error exceeds the threshold, and may determine a correct antenna port connection when the error is less than or equal to the threshold.

In another embodiment, base station 120 may receive antenna port permutations for multiple antenna ports of base station 120, and may receive expected information associated with the multiple antenna ports. Base station 120 may calculate expected values for different antenna port permutations based on the received information, and may acquire measured values associated with the different antenna port permutations. Base station 120 may compare the expected values for the different antenna port permutations with the measured values for the different antenna port permutations to determine errors for the different antenna port permutations, and may determine an optimal antenna port permutation to be one of the different antenna port permutations with the smallest determined error.

Figure 2:
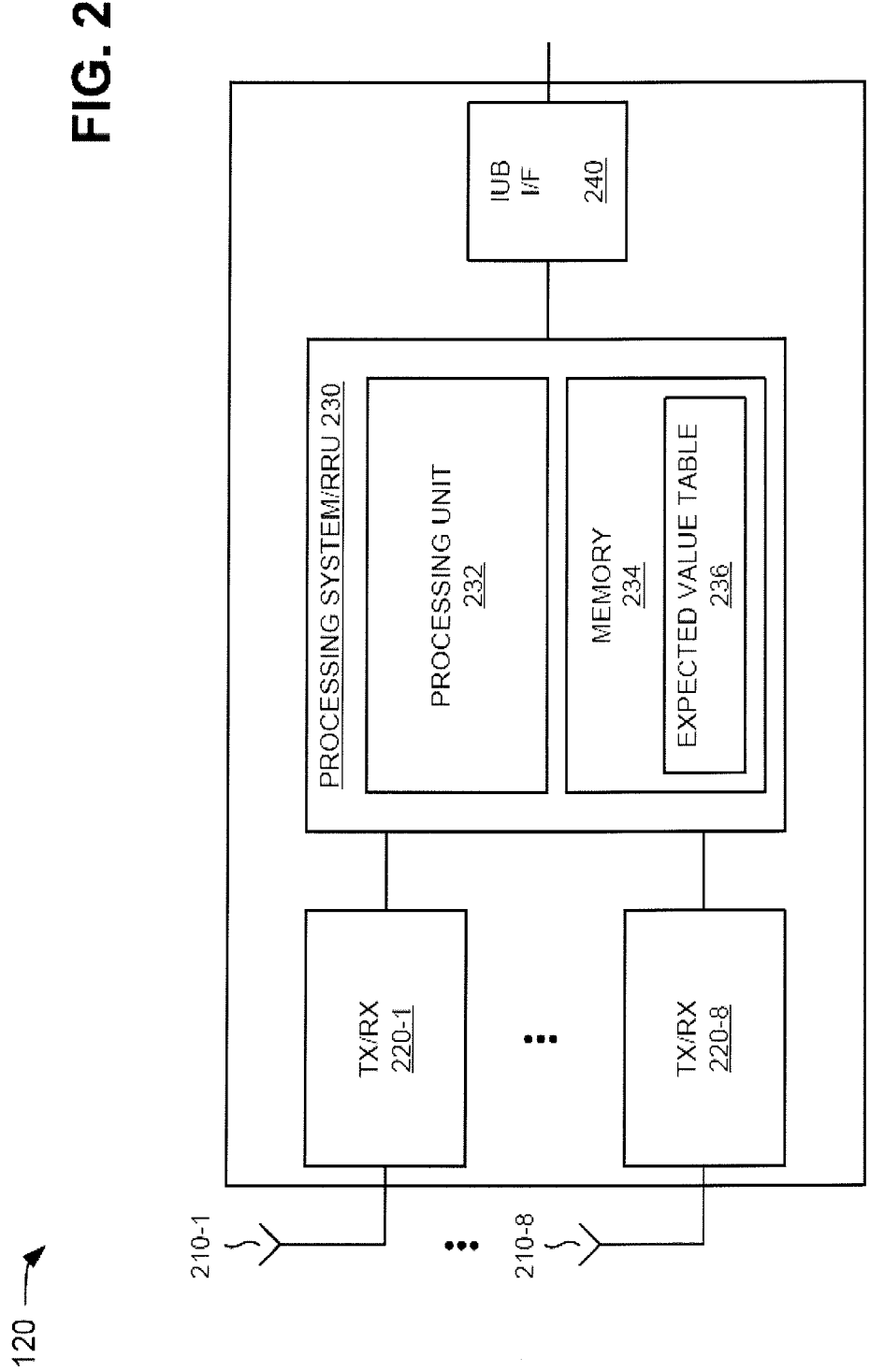
FIG. 2 illustrates a diagram of exemplary components of a base station depicted FIG. 1.

FIG. 2 illustrates a diagram of exemplary components of base station 120. As shown in FIG. 2, base station 120 may include a group of antennas 210-1 through 210-8 (referred to collectively as "antennas 210" and in some instances, individually as "antenna 210"), a group of transceivers (TX/RX) 220-1 through 220-8 (referred to collectively as "transceivers 220" and in some instances, individually as "transceiver 220"), a processing system/RRU 230, and an Iub interface (I/F) 240.

Antennas 210 may include one or more directional and/or omni-directional antennas. In one embodiment, antennas 210 may be associated with a smart antenna of base station 120. Although eight antennas 210 are shown in FIG. 2, in other embodiments, base station 120 may include more or less than eight antennas 210.

Transceivers 220 may be associated with corresponding antennas 210 and may include transceiver circuitry for transmitting and/or receiving symbol sequences in a network, such as network 100, via antennas 210.

Processing system/RRU 230 may control the operation of base station 120. Processing system/RRU 230 may also process information received via transceivers 220 and Iub interface 240. Processing system/RRU 230 may further measure quality and strength of connection, may determine the frame error rate (FER), and may transmit this information to a RNC (not shown). In one embodiment, processing system 230 may be part of a RRU that is associated with base station 120. As illustrated, processing system/RRU 230 may include a processing unit 232 and a memory 234 (e.g., that includes an expected value table 236).

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may generate control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232. As further shown in FIG. 2, memory 234 may include an expected value table 236. Expected value table 236 may be a table (e.g., provided by a vendor or a manufacturer of base station 120) that includes amplitude and/or phase information between any two antenna ports of base station 120. As shown in an exemplary embodiment of expected value table 236 (provided below), the amplitude between two antennas (e.g., two of antennas 210) may be different. Amplitude may be provided in decibels (dB) and phase may be provided in degrees (deg). Parameter "S12" may represent antenna port "1" as an input port and antenna port "2" as an output port. Base station 120 may measure amplitude/phase between two particular antennas and may compare the measured values with corresponding values provided in expected value table 236 (e.g., for the two particular antennas). If there is a large difference (e.g., greater than a particular threshold) between the measured values and the values provided in expected value table 236, base station 120 may determine that there is an antenna connection error.

Expected Value Table

| Parameter | | Frequency | | | | | |
|---|---|---|---|---|---|---|---|
| | | 1880 | 1900 | 1920 | 2010 | 2018 | 2025 |
| S11 | Amplitude[dB] | 32.42 | 27.73 | 21.2 | 20.49 | 19.89 | 19.95 |
| | Phase[deg] | 60.44 | 17.67 | −148.27 | 6.51 | −19.83 | −53.81 |
| S12 | Amplitude[dB] | 20.73 | 20.99 | 21.26 | 21.62 | 21.66 | 21.64 |
| | Phase[deg] | −90.77 | 151.7 | 34.94 | −126.48 | −174.91 | 143.09 |
| S13 | Amplitude[dB] | 27.8 | 29.71 | 30.43 | 29.75 | 29.91 | 30.25 |
| | Phase[deg] | 73.64 | −43.67 | −166.86 | 22.2 | −27.41 | −69.84 |
| S14 | Amplitude[dB] | 35.38 | 33.61 | 34.32 | 35.9 | 38.18 | 40.83 |
| | Phase[deg] | −127.64 | 106.61 | 7.69 | 177.5 | 132.83 | 88.39 |
| S15 | Amplitude[dB] | 32.97 | 34.53 | 36.41 | 36.92 | 38.17 | 39.6 |
| | Phase[deg] | −81.33 | 174.69 | 53.5 | −83.76 | −123.12 | −160.59 |
| S16 | Amplitude[dB] | 34.1 | 32.46 | 31.41 | 29.63 | 30.33 | 31.21 |
| | Phase[deg] | 68.84 | −50.64 | −145.01 | 40.11 | −4.94 | −46.26 |
| S17 | Amplitude[dB] | 34.1 | 35.06 | 39.57 | 39.79 | 39.8 | 38.83 |
| | Phase[deg] | 110.02 | 5.61 | −135.61 | 75.77 | 15.1 | −34.45 |
| S18 | Amplitude[dB] | 32.75 | 32.57 | 32.82 | 34.31 | 34.59 | 34.94 |
| | Phase[deg] | −107.36 | 126.67 | 9.76 | −175.88 | 136.23 | 93.41 |
| S1cal | Amplitude[dB] | 26.03 | 25.99 | 25.95 | 25.58 | 25.51 | 25.41 |
| | Phase[deg] | 134.94 | 115.65 | 96.72 | 12.53 | 5.2 | −1.44 |
| S22 | Amplitude[dB] | 28.94 | 26.21 | 17.56 | 17.06 | 18.78 | 21.24 |
| | Phase[deg] | 83.67 | −62.23 | −147.6 | 105.45 | 64.93 | 18.2 |
| S23 | Amplitude[dB] | 21.49 | 21.56 | 21.74 | 22.64 | 22.75 | 22.87 |
| | Phase[deg] | −73.63 | 165.77 | 49.22 | −118.43 | −165.95 | 152.11 |
| S24 | Amplitude[dB] | 27.89 | 29.38 | 30.06 | 30.3 | 30.29 | 30.48 |
| | Phase[deg] | 60.22 | −62.74 | 166.26 | −7.96 | −56.5 | −99.25 |
| S25 | Amplitude[dB] | 31.61 | 31.68 | 31.76 | 33.08 | 33.33 | 33.59 |
| | Phase[deg] | 115.27 | −66.65 | −115.9 | 62.5 | 15.88 | −25.2 |
| S26 | Amplitude[dB] | 26.71 | 28.25 | 28.63 | 26.6 | 26.82 | 26.89 |
| | Phase[deg] | −59.76 | 170.94 | 40.38 | −124.01 | −174.69 | 141.46 |
| S27 | Amplitude[dB] | 28.33 | 29.73 | 31.28 | 28.78 | 29.27 | 29.9 |
| | Phase[deg] | 88.08 | −37.85 | −152.45 | 42.32 | −7.34 | −47.57 |
| S28 | Amplitude[dB] | 35.99 | 36.3 | 36.51 | 36.9 | 36.59 | 36.16 |
| | Phase[deg] | 93.27 | −20.23 | −146.15 | 60.79 | 15.59 | −24.07 |
| S2cal | Amplitude[dB] | 26.3 | 26.26 | 26.14 | 25.32 | 25.26 | 25.3 |
| | Phase[deg] | 137.11 | 116.41 | 98.33 | 12.91 | 4.61 | −2.33 |
| S33 | Amplitude[dB] | 16.47 | 20 | 28.62 | 24.77 | 27.31 | 33.8 |
| | Phase[deg] | −129.33 | 161.77 | −171.52 | 113.47 | 80.98 | 26.54 |
| S34 | Amplitude[dB] | 21.09 | 21.14 | 21.37 | 21.89 | 21.89 | 21.84 |
| | Phase[deg] | −97.45 | 144.5 | 24.71 | −141.86 | 168.66 | 125.85 |
| S35 | Amplitude[dB] | 36.5 | 36.56 | 36.92 | 38.47 | 38.2 | 38.14 |
| | Phase[deg] | 64.79 | −53.85 | −174.55 | 34.34 | −9.47 | −47.73 |
| S36 | Amplitude[dB] | 29.97 | 30.37 | 32.47 | 32.05 | 31.94 | 32 |
| | Phase[deg] | 129.78 | 18.06 | −108.25 | 82.51 | 33.59 | −8.47 |

-continued

Expected Value Table

| | Parameter | Frequency | | | | | |
|---|---|---|---|---|---|---|---|
| | | 1880 | 1900 | 1920 | 2010 | 2018 | 2025 |
| S37 | Amplitude[dB] | 25.66 | 26.42 | 27.65 | 29.64 | 30.88 | 32 |
| | Phase[deg] | −78.74 | 169.76 | 50.16 | −98.08 | −146.41 | 169.01 |
| S38 | Amplitude[dB] | 31.71 | 31.44 | 31.51 | 29.22 | 29.36 | 29.67 |
| | Phase[deg] | 78.9 | −36.28 | −150.27 | 42 | −4.52 | −45.92 |

Iub interface 240 may include one or more line cards that allow base station 120 to transmit data to and receive data from a RNC.

As described herein, base station 120 may perform certain operations in response to processing unit 232 executing software instructions of an application contained in a computer-readable medium, such as memory 234. In one example, a computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 120, in other embodiments, base station 120 may contain fewer, different, differently arranged, or additional components than depicted in FIG. 2. In still other embodiments, one or more components of base station 120 may perform one or more other tasks described as being performed by one or more other components of base station 120.

FIGS. 3A and 3B depict diagrams of further exemplary components of base station 120. As shown in FIG. 3A, base station 120 may include an antenna bank 300 that includes eight ports 310-1 through 310-8 (referred to collectively as "ports 310" and in some instances, individually as "port 310") connected to corresponding antennas 210-1 through 210-8, and a calibration port 310-CAL. Antennas 210 may include the features described above in connection with, for example, FIG. 2.

Antenna bank 300 may include a device that enables antennas 210 to connect to transceivers 220 (FIG. 2) of base station 120, via cables. In one embodiment, antenna bank 300 may include an antenna bank for a dual-polarized eight antenna system, as shown in FIG. 3A. In another embodiment, antenna bank 300 may include an antenna bank for a normal eight antenna system.

Each of ports 310-1 through 310-8 may include a port capable of connecting one of antennas 210 to one of transceivers 220 (FIG. 2), via a cable. Each of ports 310-1 through 310-8 may be capable of connecting to a variety of cable connector types, including male connectors, female connectors, optical connectors, electrical connectors, SubMiniature version A (SMA) connectors, threaded Neill-Concelman (TNC) connectors, Bayonet Neill-Concelman (BNC) connectors, etc.

Calibration port 310-CAL may include a port capable of connecting antenna port 300 to one of transceivers 220 (FIG. 2), via a cable. Calibration port 310-CAL may be capable of connecting to a variety of cable connector types, including male connectors, female connectors, optical connectors, electrical connectors, SMA connectors, TNC connectors, BNC connectors, etc.

As shown in FIG. 3B, antenna bank 300 may connect antennas 210 (omitted from FIG. 3B for clarity) to corresponding transceivers 220, via ports 310 and RF cables 320. Transceivers 220 may communicate with processing system/RRU 230. Transceivers 220 and processing system/RRU 230 may include the features described above in connection with, for example, FIG. 2. Antenna bank 300 and ports 310 may include the features described above in connection with, for example, FIG. 3A.

Each of RF cables 320 may include a cable that transmits high frequency signals. RF cables 320 may include cables capable of connecting ports 310 to corresponding transceivers 220. RF cables 320 may include a variety of cable connector types, including male connectors, female connectors, optical connectors, electrical connectors, SMA connectors, TNC connectors, BNC connectors, etc.

As further shown in FIG. 3B, port 310-1 (and antenna 210-1) may connect to transceiver 220-1 via one of RF cables 320, port 310-2 (and antenna 210-2) may connect to transceiver 220-2 via one of RF cables 320, port 310-3 (and antenna 210-3) may connect to transceiver 220-3 via one of RF cables 320, port 310-4 (and antenna 210-4) may connect to transceiver 220-4 via one of RF cables 320, port 310-5 (and antenna 210-5) may connect to transceiver 220-5 via one of RF cables 320, port 310-6 (and antenna 210-6) may connect to transceiver 220-6 via one of RF cables 320, port 310-7 (and antenna 210-7) may connect to transceiver 220-7 via one of RF cables 320, port 310-8 (and antenna 210-8) may connect to transceiver 220-8 via one of RF cables 320, and port 310-CAL may connect to transceiver 220-CAL via one of RF cables 320. In such an arrangement there is a possibility that one of RF cables 320 may be incorrectly connected to one of ports 310 (e.g., one of antennas 210), which may generate an incorrect beam and may decrease performance of base station 120. Embodiments described automatically detect and enable correction of such connection errors.

Although FIGS. 3A and 3B show exemplary components of base station 120, in other embodiments, base station 120 may contain fewer, different, differently arranged, or additional components than depicted in FIGS. 3A and 3B. In still other embodiments, one or more components of base station 120 may perform one or more other tasks described as being performed by one or more other components of base station 120.

Figure 4:
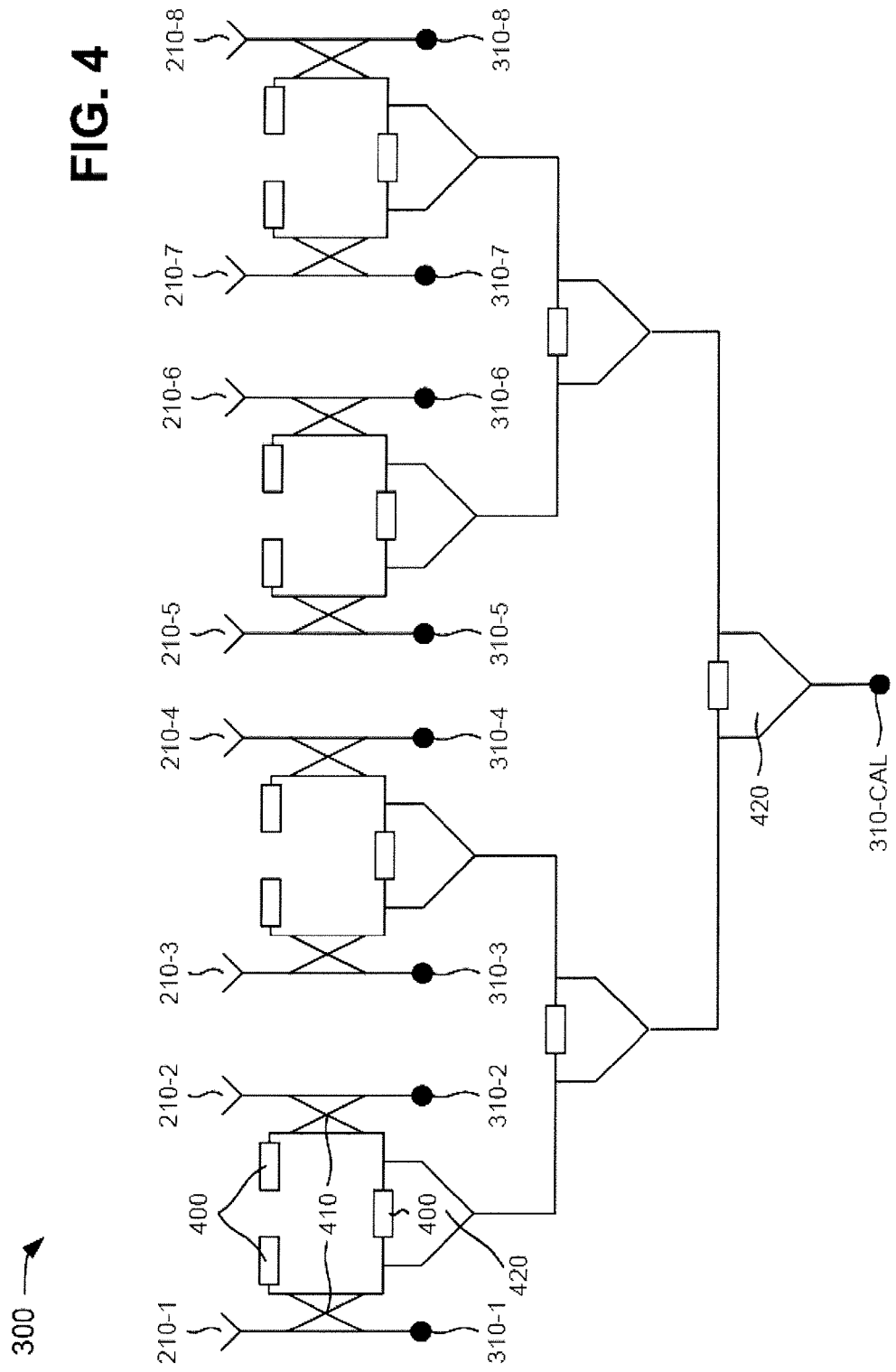
FIG. 4 depicts a diagram of exemplary components of an antenna bank illustrated in FIGS. 3A and 3B.

FIG. 4 depicts a diagram of exemplary components of antenna bank 300. As shown, antenna bank 300 may include antennas 210, ports 310, calibration port 310-CAL, loads 400, directional couplers 410, and power splitters 420. Antennas 210 may include the features described above in connection with, for example, FIG. 2. Ports 310 and calibration port 310-CAL may include the features described above in connection with, for example, FIGS. 3A and 3B. FIG. 4 shows multiple loads 400, directional couplers 410, and power splitters 420, although only a few of them are labeled (for clarity).

Each of loads 400 may include a device connected to an output (e.g., one of ports 310) of a circuit. In one embodiment, each of loads 400 may include a device where power is consumed.

Each of directional couplers 410 may include a passive device that couples a portion of transmission power in a transmission line (e.g., a line connected to antenna 210-1) by a particular amount out through another port. In one embodiment, each of directional couplers 410 may use two transmission lines set close enough together such that energy passing through one transmission line (e.g., a line connected to antenna 210-1) is coupled to the other transmission line (e.g., a line connecting two loads 400).

Each of power splitters 420 may include a passive device that receives an input signal and generates multiple output signals with specific phase and amplitude characteristics. In one embodiment, each of power splitters 420 may include a "T" connection, which has one input and two outputs. If the "T" connection is mechanically symmetrical, a signal applied to the input may be divided into two output signals, equal in amplitude and phase.

Although FIG. 4 shows exemplary components of antenna bank 300, in other embodiments, antenna bank 300 may contain fewer, different, differently arranged, or additional components than depicted in FIG. 4. In still other embodiments, one or more components of antenna bank 300 may perform one or more other tasks described as being performed by one or more other components of antenna bank 300.

Figure 5:
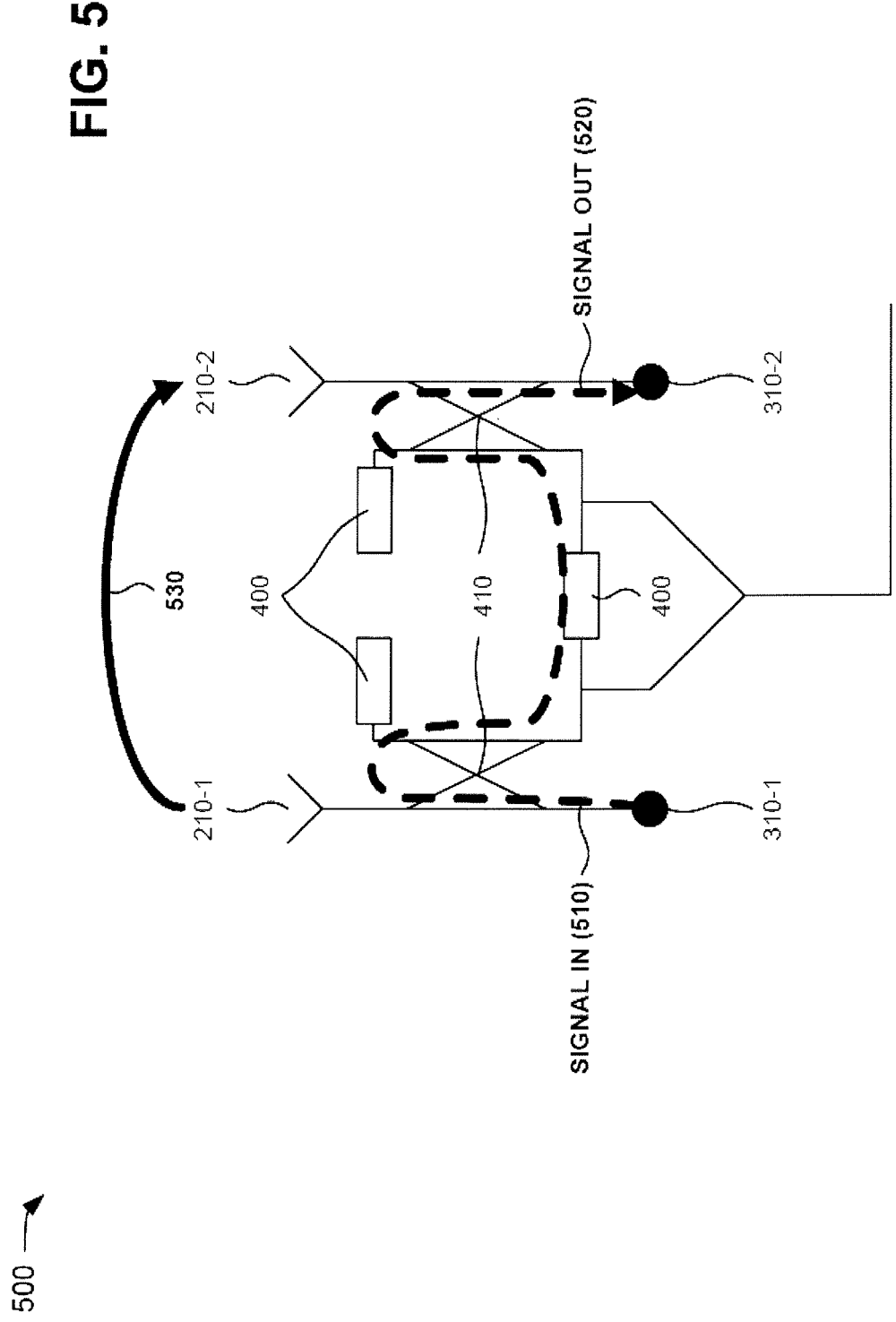
FIG. 5 illustrates a diagram of exemplary interactions among exemplary components of a portion of the antenna bank depicted in FIG. 4.

FIG. 5 illustrates a diagram of exemplary interactions among exemplary components of a portion 500 of antenna port 300. As shown, portion 500 of antenna bank 300 may include antennas 210-1 and 210-2, ports 310-1 and 310-2, loads 400, and directional couplers 410. Antennas 210-1 and 210-2 may include the features described above in connection with, for example, FIG. 2. Ports 310-1 and 310-2 may include the features described above in connection with, for example, FIGS. 3A and 4B. Loads 400 and directional couplers 410 may include the features described above in connection with, for example, FIG. 4.

As further shown in FIG. 5, antennas 210-1 and 210-2 may be internally coupled together via a circuit that includes loads 400 and directional couplers 410. For example, an input signal 510 may be input at port 310-1, may travel through the circuit, and may be received as an output signal 520 at port 310-2. Antennas 210-1 and 210-2 may be externally coupled together via wireless wave propagation between antennas 210-1 and 210-2. For example, input signal 510 may cause antenna 210-1 to transmit a wireless signal 530 that may be received by antenna 210-2 and provided to port 310-2. The external coupling of antennas 210-1 and 210-2 may depend on a physical environment (e.g., a very site specific environment) of base station 120 and antennas 210-1 and 210-2. In one embodiment, a filter may be provided (e.g., with antennas 210-1 and 210-2) that filters out surrounding objects of the physical environment.

Base station 120 may use signals 510-530 to measure an amplitude and/or a phase between antennas 210-1 and 210-2 (and ports 310-1 and 310-2). Base station 120 may compare the values provided in expected value table 236 (FIG. 2) with the measured amplitude and/or measured phase between antennas 210-1 and 210-2 (and ports 310-1 and 310-2). If there is a large difference (e.g., greater than a particular threshold (e.g., +/−ten percent)) between the table values and the measured amplitude and/or phase, base station 120 may determine that there is an antenna connection error.

Although FIG. 5 shows exemplary interactions among components of antenna bank 300, in other embodiments, components of antenna bank 300 may perform fewer, different, or additional interactions than depicted in FIG. 5.

Figure 6:
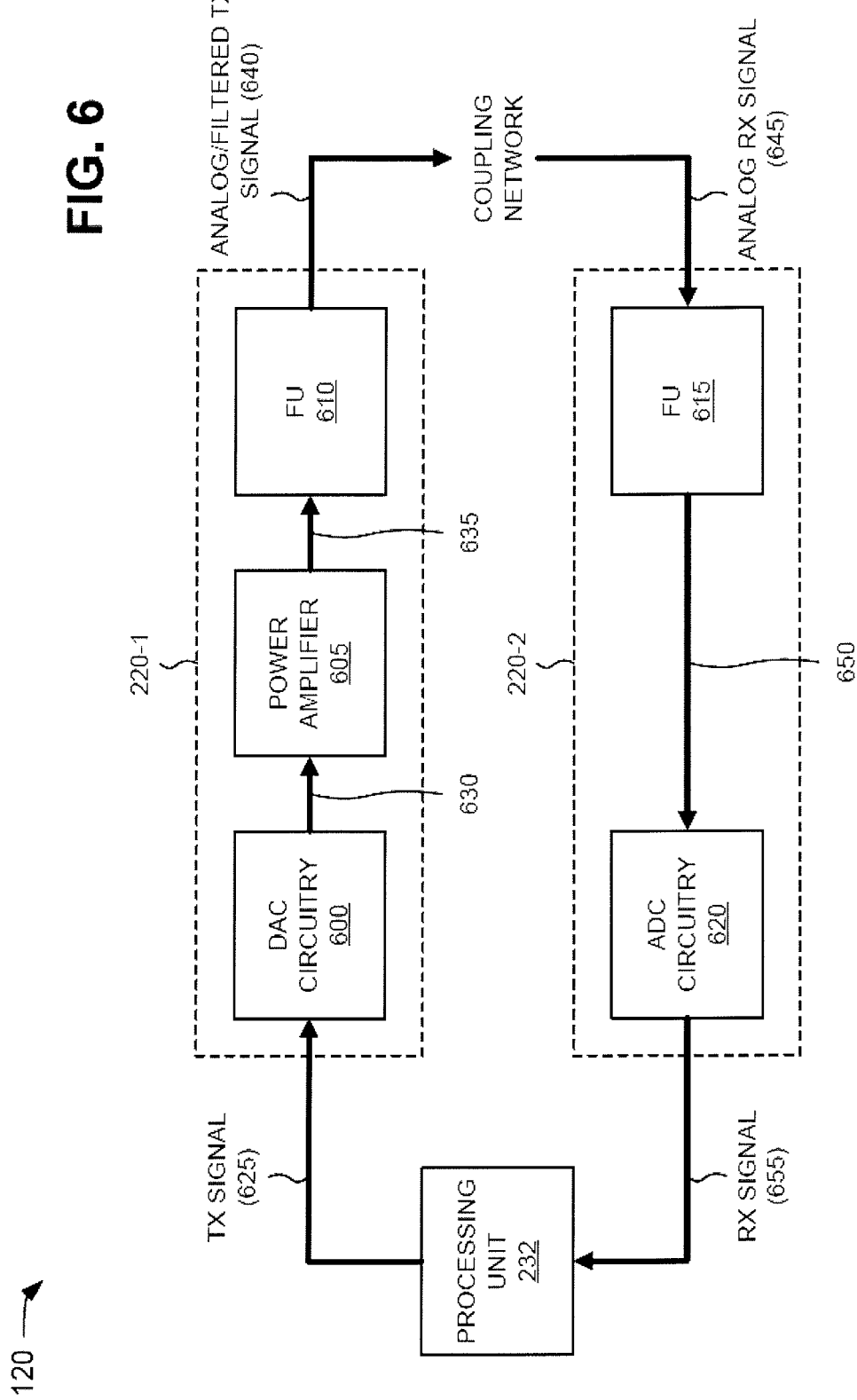
FIG. 6 illustrates a diagram of additional exemplary components of the base station depicted FIG. 1.

FIG. 6 illustrates a diagram of additional exemplary components of base station 120. As shown base station 120 may include a first transceiver 220-1 that includes digital-to-analog converter (DAC) circuitry 600, a power amplifier 605, and a filter unit (FU) 610; a second transceiver 220-2 that includes a filter unit 615 and analog-to-digital converter (ADC) circuitry 620; and processing unit 232. Transceivers 220-1 and 220-2 and processing unit 232 may include the features described above in connection with, for example, FIG. 2.

DAC circuitry 600 may include a device or circuitry that converts a digital signal (e.g., binary code or numbers) to an analog signal (e.g., current, voltage, or electric charge). In one embodiment, DAC circuitry 600 may include one or more of a pulse width modulator DAC, an oversampling DAC, an interpolating DAC, a binary weighted DAC, etc.

Power amplifier 605 may include a device that changes (e.g., increases) an amplitude of a signal (e.g., a voltage, a current, etc.). In one embodiment, power amplifier 605 may include one or more of a transistor amplifier, an operational amplifier, a fully differential amplifier, etc.

Each of filter units 610 and 615 may include an electronic circuit that performs signal processing functions to remove unwanted frequency components from a signal, to enhance desired frequency components in the signal, or both. In one embodiment, each of filter units 610 and 615 may include one or more of a passive filter unit, an active filter unit, an analog filter unit, a digital filter unit, a high-pass filter unit, a low-pass filter unit, a bandpass filter unit, band-reject filter unit, an all-pass filter unit, a discrete-time filter unit, a continuous-time filter unit, a linear filter unit, a non-linear filter unit, an infinite impulse response filter unit, a finite impulse response filter unit, etc.

ADC circuitry 620 may include a device or circuitry that converts an analog signal (e.g., current, voltage, or electric charge) to a digital signal (e.g., binary code or numbers). In one embodiment, ADC circuitry 620 may include one or more of a linear ADC, a non-linear ADC, a direct conversion ADC, a successive-approximation ADC, a ramp-compare ADC, etc.

As further shown in FIG. 6, in order to calibrate antennas 210 associated with transceivers 220-1 and 220-2, processing unit 232 may provide a digital transmission (TX) signal 625 to transceiver 220-1, and DAC circuitry 600 may receive digital TX signal 625. DAC circuitry 600 may convert digital TX signal 625 to an analog TX signal 630, and may provide analog TX signal 630 to power amplifier 605. Power amplifier 605 may amplify analog TX signal 630 to produce an amplified, analog TX signal 635, and may provide amplified, analog TX signal 635 to filter unit 610. Filter unit 610 may filter amplified, analog TX signal 635 to produce a signal 640 (e.g., which is a filtered, amplified, and analog TX signal), and may provide signal 640 to a coupling network. The coupling network may include, for example, the internally and externally coupled antennas 210-1 and 210-2 and ports 310-1 and 310-2 shown in FIG. 5.

Signal 640 may be input to port 310-1 as input signal 510 (FIG. 5), and may travel through the coupling network until it reaches port 310-2 as output signal 520 (FIG. 5). Output signal 520 may be provided to transceiver 220-2 as an analog reception (RX) signal 645, and filter unit 615 may receive analog RX signal 645. Filter unit 615 may filter analog RX signal 645 to produce a filtered, analog RX signal 650, and may provide filtered, analog RX signal 650 to ADC circuitry 620. ADC circuitry 620 may convert filtered, analog RX signal 650 to a digital RX signal 655, and may provide digital RX signal 655 to processing unit 232.

Processing unit 232 may compare digital TX signal 625 and digital RX signal 655 to determine a measured value (e.g., a difference between digital TX signal 625 and digital RX signal 655) of amplitude and/or phase. Since the amplitude and phase provided by transceivers 220-1 and 220-2 may be known, processing unit 232 may calculate an amplitude and/or phase between antenna ports (e.g., ports 310-1 and 310-2, which are associated with antennas 210-1 and 210-2) based on the measured value and the known amplitude and phase provided by transceivers 220-1 and 220-2. Processing unit 232 may compare the values provided in expected value table 236 (FIG. 2) with the measured amplitude and/or phase between the antenna ports (e.g., ports 310-1 and 310-2). If there is a large difference (e.g., greater than a particular threshold (e.g., +/−ten percent)) between the table values and the measured amplitude and/or phase, processing unit 232 may determine that there is an antenna connection error.

Although FIG. 6 shows exemplary components of base station 120, in other embodiments, base station 120 may contain fewer, different, differently arranged, or additional components than depicted in FIG. 6. In still other embodiments, one or more components of base station 120 may perform one or more other tasks described as being performed by one or more other components of base station 120.

Figure 7:
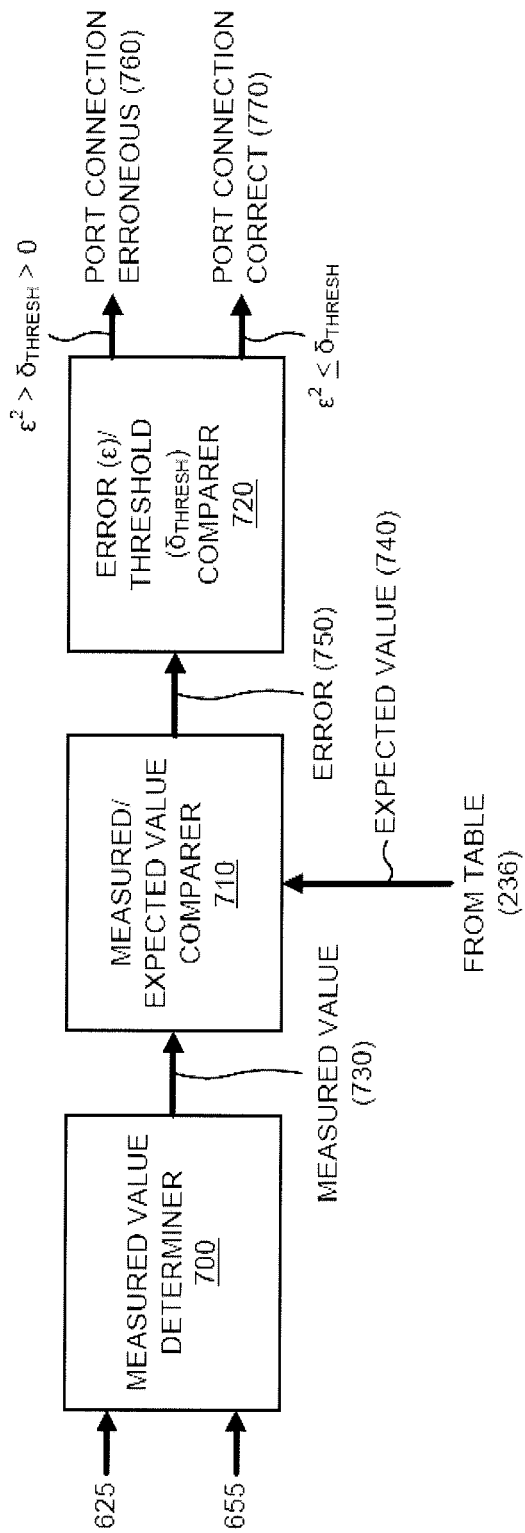
FIGS. 7 and 8 depict diagrams of exemplary functional components of the base station illustrated in FIG. 1.

FIG. 7 depicts a diagram of exemplary functional components of base station 120. As shown, base station 120 may include a measured value determiner 700, a measured/expected value comparer 710, and an error/threshold comparer 720. In one embodiment, the functions described in connection with FIG. 7 may be performed by processing unit 232 (FIG. 2).

Measured value determiner 700 may include any hardware, software, or combination of hardware and software that may receive digital TX signal 625 and digital RX signal 655. Measured value determiner 700 may compare digital TX signal 625 and digital RX signal 655 to determine a difference between the amplitude and/or the phase of digital TX signal 625 and digital RX signal 655. Since the amplitude and phase provided by transceivers 220 may be known, measured value determiner 700 may calculate a measured value ($S_{measured}$) 730 (e.g., an amplitude and/or phase between two antenna ports 310) based on the determined difference and the known amplitude and phase provided by transceivers 220. Measured value determiner 700 may provide measured value 730 to measure/expected value comparer 710.

Measured/expected value comparer 710 may include any hardware, software, or combination of hardware and software that may receive measured value 730 from measured value determiner 700, and may receive an expected value ($S_{expected}$) 740 from expected value table 236. Measured/expected value comparer 710 may compare measured value ($S_{measured}$) 730 and expected value ($S_{expected}$) 740. In one embodiment, measured/expected value comparer 710 may determine a difference between measured value ($S_{measured}$) 730 and expected value ($S_{expected}$) 740 (i.e., $S_{measured} - S_{expected}$) to be an error ($\epsilon$) 750, and may square error ($\epsilon$) 750 according to the following squared matrix norm (e.g., the squared Frobenius norm):

$$\epsilon^2 = \|S_{measured} - S_{expected}\|_F^2,$$

where $S_{measured}$ and $S_{expected}$ may denote measured and expected complex value S-matrices. A complex S-matrix may contain all the S-parameters (e.g., an (i, j) element of the S-matrix may contain a parameter (Sij), which may represent an amplitude and phase between ports i and j in complex form).

Error/threshold comparer 720 may include any hardware, software, or combination of hardware and software that may receive error ($\epsilon$) 750 from measured/expected value comparer 710, and may compare the squared error 750 to a threshold ($\delta_{THRESH}$). Since a measurement error may always be present, a few decibels (e.g., one to five decibels) or few degree (e.g., one to five degrees) margin may be added as the threshold. Error/threshold comparer 720 may determine that a port connection (e.g., in base station 120) is erroneous (as indicated by reference number 760) if the squared error 750 is greater than the threshold (e.g., $\epsilon^2 > \delta_{THRESH} > 0$). Error/threshold comparer 720 may determine that a port connection (e.g., in base station 120) is correct (as indicated by reference number 770) if the squared error 750 is less than or equal to the threshold (e.g., $\epsilon^2 \leq \delta_{THRESH}$).

Although FIG. 7 shows exemplary functional components of base station 120, in other embodiments, base station 120 may contain fewer, different, differently arranged, or additional functional components than depicted in FIG. 7. In still other embodiments, one or more functional components of base station 120 may perform one or more other tasks described as being performed by one or more other functional components of base station 120.

Figure 8:
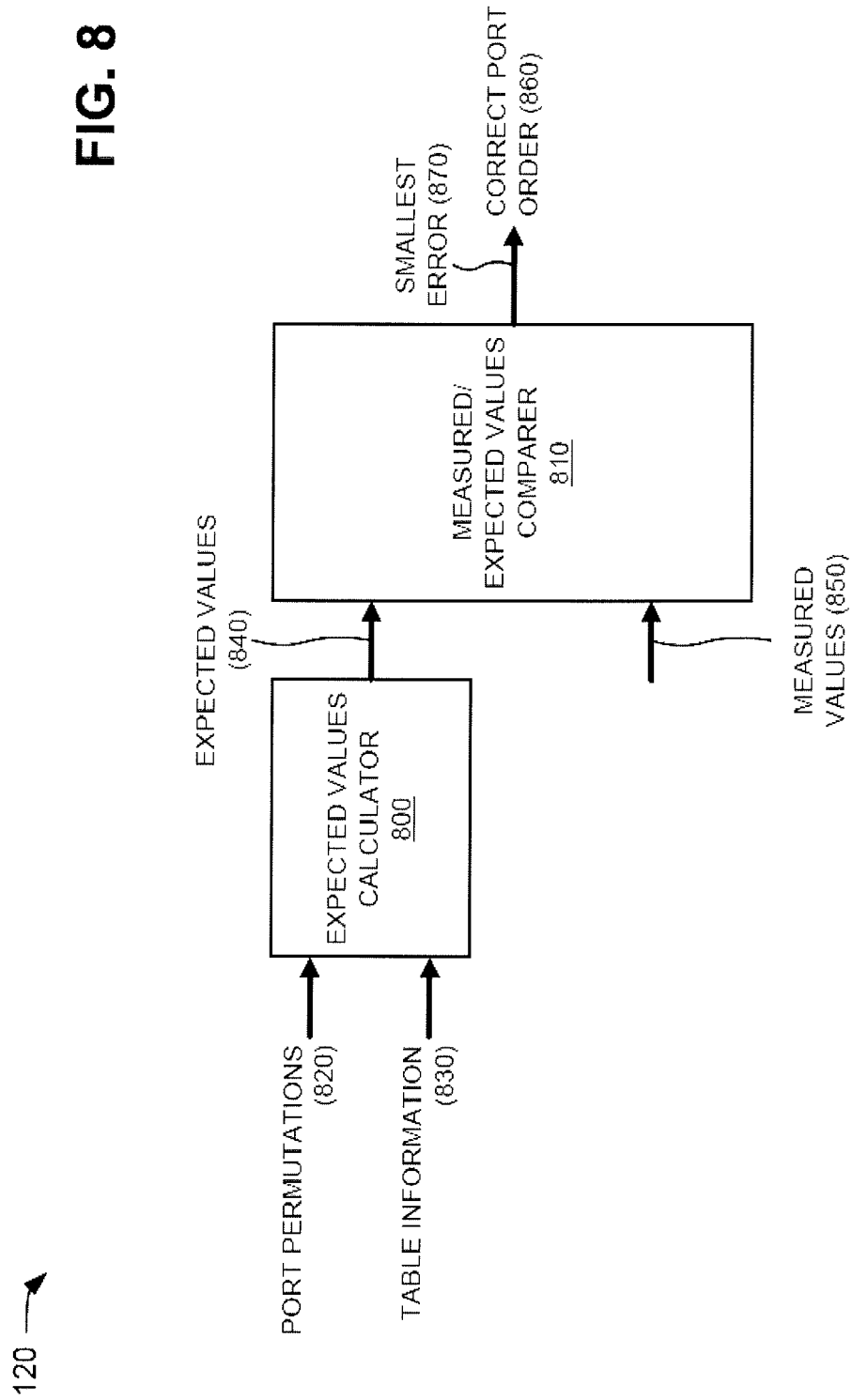

FIG. 8 illustrates a diagram of exemplary functional components of base station 120. As shown, base station 120 may include an expected values calculator 800 and a measured/expected values comparer 810. In one embodiment, the functions described in connection with FIG. 8 may be performed by processing unit 232 (FIG. 2).

Expected values calculator 800 may include any hardware, software, or combination of hardware and software that may receive port permutations 820 (e.g., different combinations of antennas 210, ports 310, and RF cables 320) for multiple antenna ports 310 of base station 120, and may receive table information 830 (e.g., expected values from expected value table 236 (FIG. 2)) associated with the multiple antenna ports 310. Expected values calculator 800 may calculate expected values 840 (e.g., S-matrices) for different antenna port permutations based on port permutations 820 and table information 830. Expected values calculator 800 may provide expected values 840 to measured/expected values comparer 810.

Measured/expected values comparer 810 may include any hardware, software, or combination of hardware and software that may receive expected values 840 from expected values calculator 800, and may acquire measured values 850 associated with the different antenna port permutations. Measured/expected values comparer 810 may compare expected values 840 with measured values 850 to determine errors for the different antenna port permutations. Measured/expected values comparer 810 may determine an optimal antenna port permutation (i.e., a correct port order 860) to be one of the different antenna port permutations with a smallest determined error 870 (e.g., as determined by: $\epsilon^2 = \|S_{measured} - S_{expected}\|_F^2$).

Although FIG. 8 shows exemplary functional components of base station 120, in other embodiments, base station 120 may contain fewer, different, differently arranged, or additional functional components than depicted in FIG. 8. In still other embodiments, one or more functional components of base station 120 may perform one or more other tasks described as being performed by one or more other functional components of base station 120.

Figure 9:
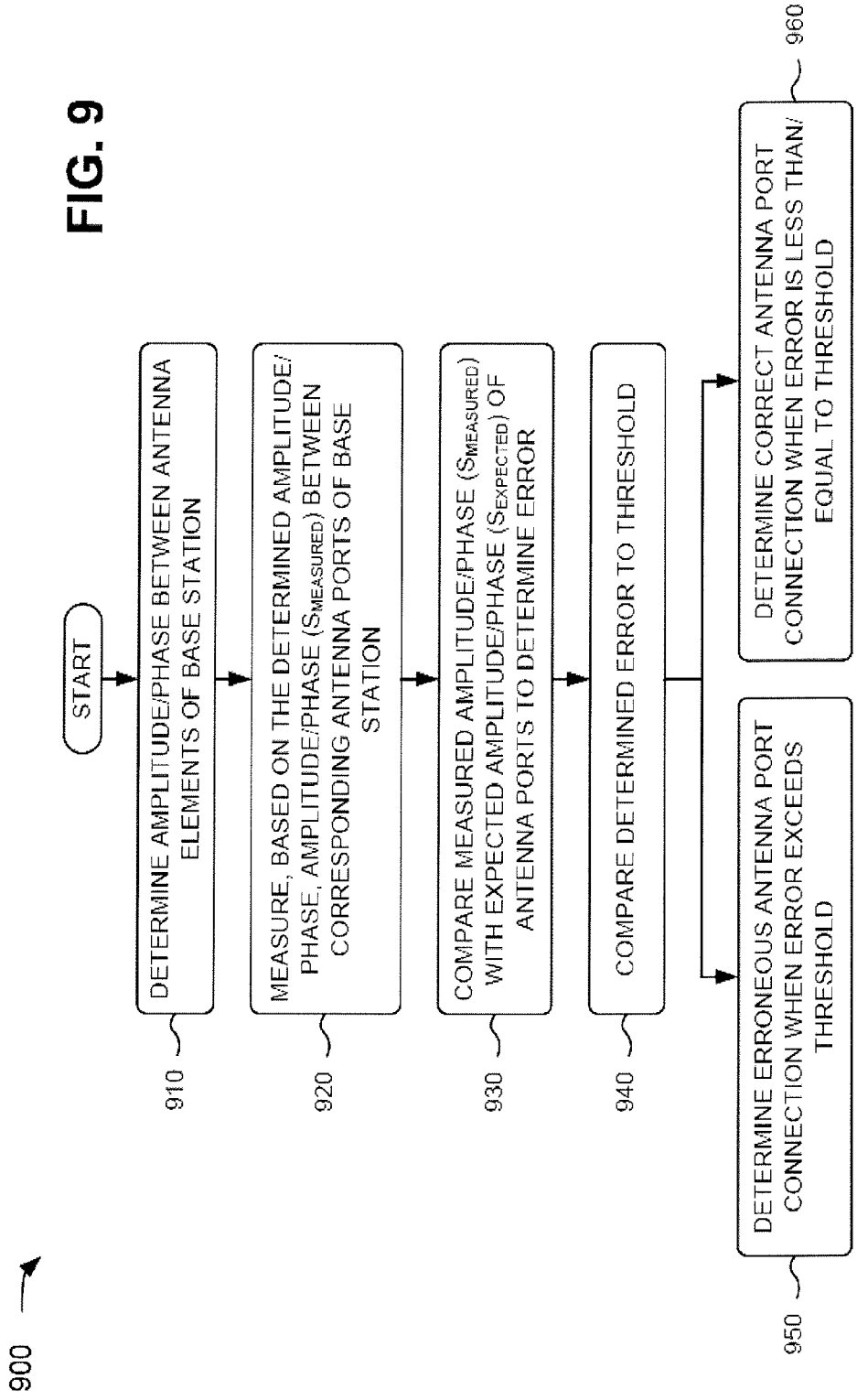
FIGS. 9 and 10 illustrate flow charts of an exemplary process for automatically detecting a connection error in a smart antenna according to embodiments described herein.
Figure 10:
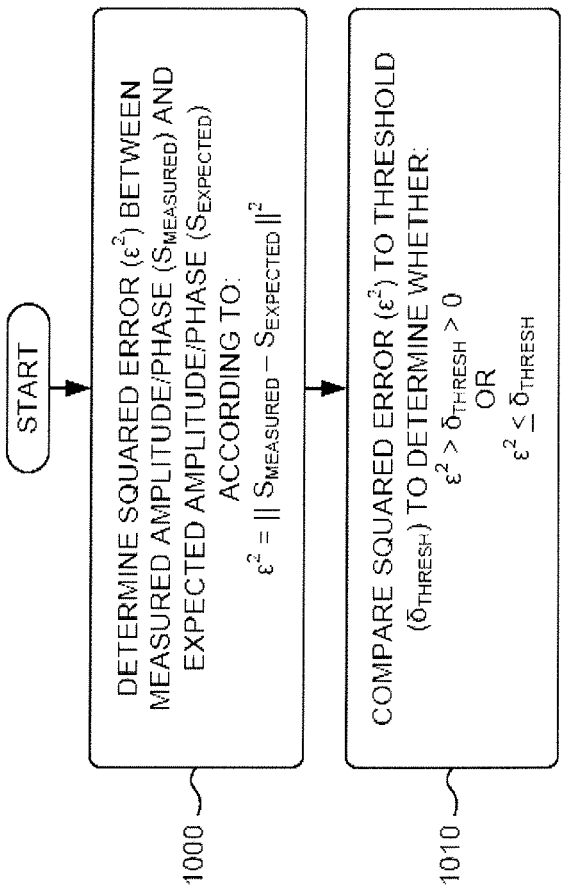

FIGS. 9 and 10 illustrate flow charts of an exemplary process 900 for automatically detecting a connection error in a smart antenna according to embodiments described herein. In one embodiment, process 900 may be performed by base station 120. In other embodiments, some or all of process 900 may be performed by base station 120 in combination with another device (e.g., a RRU) or group of devices (e.g., communicating with base station 120).

As illustrated in FIG. 9, process 900 may include determining an amplitude/phase between antenna elements of a base station (block 910), and measuring, based on the determined amplitude/phase, an amplitude/phase ($S_{measured}$) between corresponding antenna ports of the base station (block 920). For example, in embodiments described above in connection with FIG. 7, measured value determiner 700 of base station 120 may receive digital TX signal 625 and digital RX signal 655. Measured value determiner 700 may compare digital TX signal 625 and digital RX signal 655 to determine a difference between the amplitude and/or the phase of digital TX signal 625 and digital RX signal 655. Since the amplitude and the phase provided by transceivers 220 may be known, measured value determiner 700 may calculate measured value ($S_{measured}$) 730 (e.g., an amplitude and/or phase between two antenna ports 310) based on the determined difference and the known amplitude and phase provided by transceivers 220.

Returning to FIG. 9, the measured amplitude/phase ($S_{measured}$) may be compared with an expected amplitude/phase ($S_{expected}$) of the antenna ports to determine an error (block 930), and the determined error may be compared to a threshold (block 940). For example, in embodiments described above in connection with FIG. 7, measured/expected value comparer 710 of base station 120 may receive measured value 730 from measured value determiner 700, and may receive expected value ($S_{expected}$) 740 from expected value table 236. Measured/expected value comparer 710 may compare measured value ($S_{measured}$) 730 and expected value ($S_{expected}$) 740. In one example, measured/expected value comparer 710 may determine a difference between measured value ($S_{measured}$) 730 and expected value ($S_{expected}$) 740 (i.e., $S_{measured} - S_{expected}$) to be an error ($\epsilon$) 750. Error/threshold comparer 720 of base station 120 may receive error ($\epsilon$) 750 from measured/expected value comparer 710, and may compare the squared error 750 to a threshold ($\delta_{THRESH}$). In one example, the threshold (e.g., for the amplitude and phase values) may be set equal to a product of a particular percentage (e.g., ten percent) and the amplitude and phase values provided in expected value table 236.

As further shown in FIG. 9, an erroneous antenna port connection may be determined when the error exceeds the threshold (block 950), and a correct antenna port connection may be determined when the error is less than or equal to the threshold (block 960). For example, in embodiments described above in connection with FIG. 7, error/threshold comparer 720 of base station 120 may determine that a port connection (e.g., in base station 120) is erroneous (as indicated by reference number 760) if the squared error 750 exceeds the threshold ($\delta_{THRESH}$). Error/threshold comparer 720 may determine that a port connection (e.g., in base station 120) is correct (as indicated by reference number 770) if the squared error 750 is less than or equal to the threshold ($\delta_{THRESH}$).

Process blocks 930 and 940 may include the process blocks depicted in FIG. 10. As shown in FIG. 10, process blocks 930 and 940 may include determining a squared error ($\epsilon^2$) between the measured amplitude/phase ($S_{measured}$) and the expected amplitude/phase ($S_{expected}$) according to $\epsilon^2 = \|S_{measured} - S_{expected}\|_F^2$ (block 1000), and comparing the squared error ($\epsilon^2$) to the threshold ($\delta_{THRESH}$) to determine whether $\epsilon^2 > \delta_{THRESH} > 0$ or $\epsilon^2 \leq \delta_{THRESH}$ (block 1010). For example, in embodiments described above in connection with FIG. 7, measured/expected value comparer 710 of base station 120 may determine a difference between measured value ($S_{measured}$) 730 and expected value ($S_{expected}$) 740 (i.e., $S_{measured} - S_{expected}$) to be error ($\epsilon$) 750, and may square error ($\epsilon$) 750 according to the following squared matrix norm (e.g., the squared Frobenius norm): $\epsilon^2 = \|S_{measured} - S_{expected}\|_F^2$. Error/threshold comparer 720 of base station may compare the squared error 750 to a threshold ($\delta_{THRESH}$). Error/threshold comparer 720 may determine that a port connection (e.g., in base station 120) is erroneous (as indicated by reference number 760) if the squared error 750 greater than the threshold (e.g., $\epsilon^2 > \delta_{THRESH} > 0$). Error/threshold comparer 720 may determine that a port connection (e.g., in base station 120) is correct (as indicated by reference number 770) if the squared error 750 is less than or equal to the threshold (e.g., $\epsilon^2 \leq \delta_{THRESH}$).

Figure 11:
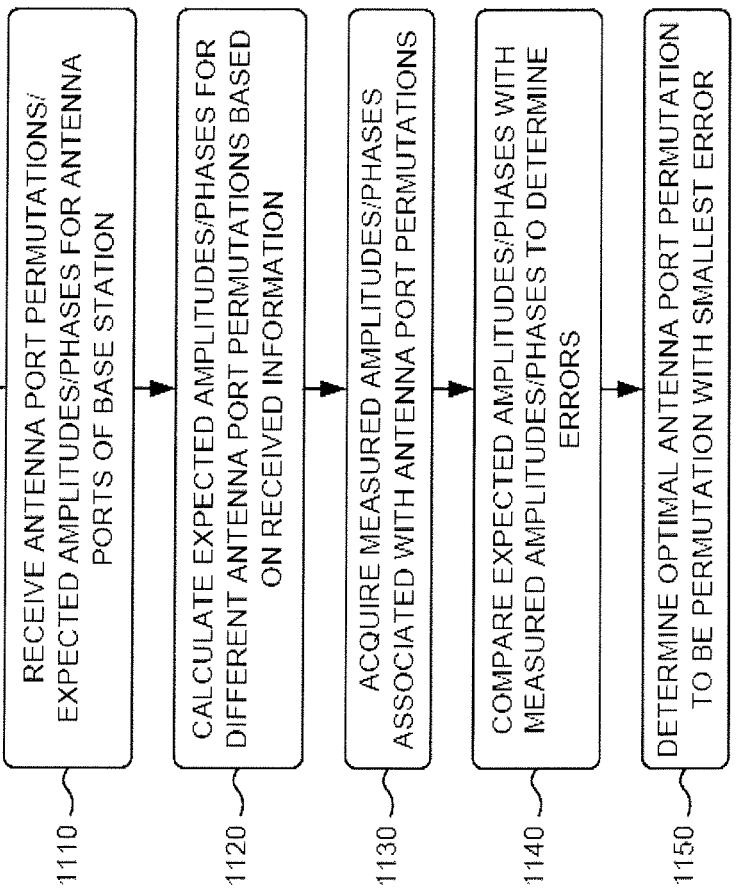
FIG. 11 depicts a flow chart of an exemplary process for determining an optimal antenna port permutation in a smart antenna according to embodiments described herein.

FIG. 11 illustrates a flow chart of another exemplary process 1100 for determining an optimal antenna port permutation in a smart antenna according to embodiments described herein. In one embodiment, process 1100 may be performed by base station 120. In other embodiments, some or all of process 1100 may be performed by base station 120 in combination with another device (e.g., a RRU) or group of devices (e.g., communicating with base station 120).

As illustrated in FIG. 11, process 1100 may include receiving antenna port permutations and amplitudes/phases for antenna ports of a base station (block 1110), and calculating expected amplitudes/phases for different antenna port permutations based on the received information (block 1120). For example, in embodiments described above in connection with FIG. 8, expected values calculator 800 of base station 120 may receive port permutations 820 (e.g., different combinations of antennas 210, ports 310, and RF cables 320) for multiple antenna ports 310 of base station 120, and may receive table information 830 (e.g., expected values from expected value table 236 (FIG. 2)) associated with the multiple antenna ports 310. Expected values calculator 800 may calculate expected values 840 (e.g., S-matrices) for different antenna port permutations based on port permutations 820 and table information 830.

As further shown in FIG. 11, measured amplitudes/phases associated with the antenna port permutations may be acquired (block 1130), the expected amplitudes/phases may be compared with the measured amplitudes/phases to determine errors (block 1140), and an optimal antenna port permutation may be determined to be a permutation with the smallest error (block 1150). For example, in embodiments described above in connection with FIG. 8, measured/expected values comparer 810 of base station 120 may acquire measured values 850 associated with the different antenna port permutations, and may compare expected values 840 with measured values 850 to determine errors for the different antenna port permutations. Measured/expected values comparer 810 may determine an optimal antenna port permutation (i.e., a correct port order 860) to be one of the different antenna port permutations with a smallest determined error 870 (e.g., as determined by: $\epsilon^2 = \|S_{measured} - S_{expected}\|_F^2$).

Embodiments described herein may automatically detect a connection error in a smart antenna (e.g., of a base station or RRU) by measuring an amplitude and/or a phase between antenna ports of the smart antenna. In one embodiment, for example, in order to transmit and receive signals accurately, every antenna element, RF cable, and transceiver making up the smart antenna may need to operate identically. This means that every transmitting and receiving link may need to have the same amplitude and phase response. The base station may automatically implement a smart antenna calibration procedure that includes compensating the amplitude and phase of each transmitting and receiving link.

Such an arrangement may ensure that connection errors are automatically and easily detected, and that performance issues due to connection errors are minimized. The arrangement may not require an uplink signal, and thus may not require an operational wireless communication network or extra equipment to generate an uplink signal.

Embodiments described herein provide illustration and description, but are not intended to be exhaustive or to limit the implementations to the precise form disclosed. Modifications and variations are possible in light of the above teachings, or may be acquired from practice of the implementations. For example, while series of blocks have been described with regard to FIGS. 9-11, the order of the blocks may be modified in other embodiments. Further, non-dependent blocks may be performed in parallel. In another example, although the systems and/or methods described herein have been implemented in base station 120, in other embodiments, the systems and/or methods may be implemented in any device that uses antenna bank 300.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the terms "one" or similar language is used. Further, the phrase "based on" is intended to mean "based, at least in part, on" unless explicitly stated otherwise.

What is claimed is:

1. A method in a radio network that includes a device, the method comprising:
   measuring, via the device, a parameter associated with at least two antenna ports of the device, each antenna port being simultaneously connected to a respective transceiver via a respective cable;
   comparing, via the device, the measured parameter with an expected parameter associated with the at least two antenna ports to determine an error;
   comparing, via the device, the determined error to a threshold; and
   determining, via the device:
      an erroneous antenna port connection for the at least two antenna ports when the error exceeds the threshold; and
      a correct antenna port connection for the at least two antenna ports when the error is less than or equal to the threshold.

2. The method of claim 1, wherein the measuring, via the device, the parameter comprises:
   determining a parameter associated with at least two antenna elements of the device, where the at least two antenna elements are associated with the at least two antenna ports; and
   measuring, based on the determined parameter associated with the at least two antenna elements, the measured parameter.

3. The method of claim 2, where the determined parameter associated with the at least two antenna elements comprises one or more of an amplitude or a phase.

4. The method of claim 1, where the measured parameter associated with the at least two antenna ports comprises one or more of an amplitude or a phase.

5. The method of claim 1, where the measured parameter associated with the at least two antenna ports comprises a difference between a signal transmitted via one of the at least two antenna ports and a signal received via another one of the at least two antenna ports.

6. The method of claim 1, wherein the comparing, via the device, the measured parameter ($S_{MEASURED}$) with the expected parameter ($S_{EXPECTED}$) comprises determining a squared error ($\epsilon^2$) between the measured parameter ($S_{MEASURED}$) and the expected parameter ($S_{EXPECTED}$) according to:

$$\epsilon^2 = \|S_{MEASURED} - S_{EXPECTED}\|^2.$$

7. The method of claim 6, wherein the comparing, via the device, the determined error ($\epsilon$) to the threshold ($\delta_{THRESHOLD}$) comprises comparing the squared error ($\epsilon^2$) to the threshold ($\delta_{THRESHOLD}$) to determine whether:

$$\epsilon^2 > \delta_{THRESHOLD} > 0, \text{ or}$$

$$\epsilon^2 \leq \delta_{THRESHOLD}.$$

8. The method of claim 1, further comprising:
   receiving antenna port permutations for a plurality of antenna ports of the device;
   receiving expected information associated with the plurality of antenna ports;
   calculating expected values for different antenna port permutations based on the received information;
   acquiring measured values associated with the different antenna port permutations;

comparing the expected values for the different antenna port permutations with the measured values for the different antenna port permutations to determine errors for the different antenna port permutations; and determining an optimal antenna port permutation to be one of the different antenna port permutations with the smallest determined error.

9. The method of claim 1, where the device comprises a base station.

10. The method of claim 1, where the device comprises a remote radio unit associated with a base station.

11. The method of claim 1, where the expected parameter is obtained from an expected value table of the device.

12. A device in a radio network, the device comprising:
a plurality of antenna ports;
a plurality of transceivers;
a memory configured to store a plurality of instructions; and
a processing unit to execute instructions in the memory to:
measure a parameter associated with at least two antenna ports of the plurality of antenna ports, each of the at least two antenna ports being simultaneously connected to a respective transceiver via a respective cable;
compare the measured parameter with an expected parameter associated with the at least two antenna ports to determine an error;
compare the determined error to a threshold; and
determine:
an erroneous antenna port connection for the at least two antenna ports when the error exceeds the threshold; and
a correct antenna port connection for the at least two antenna ports when the error is less than or equal to the threshold.

13. The device of claim 12, where the device further comprises:
at least two antenna elements associated with the at least two antenna ports; and
where the processing unit is further configured to execute instructions in the memory to:
determine a parameter associated with the at least two antenna elements; and
measure, based on the determined parameter associated with the at least two antenna elements, the measured parameter.

14. The device of claim 13, where the determined parameter associated with the at least two antenna elements comprises one or more of an amplitude or a phase.

15. The device of claim 12, where the measured parameter associated with the at least two antenna ports comprises one or more of an amplitude or a phase.

16. The device of claim 12, where the measured parameter associated with the at least two antenna ports comprises a difference between a signal transmitted via one of the at least two antenna ports and a signal received via another one of the at least two antenna ports.

17. The device of claim 12, where, when comparing the measured parameter with the expected parameter, the processing unit is further configured to execute instructions in the memory to determine a squared error ($\epsilon^2$) between the measured parameter ($S_{MEASURED}$) and the expected parameter ($S_{EXPECTED}$) according to:

$$\epsilon^2 = \|S_{MEASURED} - S_{EXPECTED}\|^2.$$

18. The device of claim 17, where, when comparing the determined error to the threshold ($\delta_{THRESHOLD}$), the processing unit is further configured to execute instructions in the memory to compare the squared error ($\epsilon^2$) to the threshold ($\delta_{THRESHOLD}$) to determine whether:

$$\epsilon^2 > \delta_{THRESHOLD} > 0, \text{ or}$$

$$\epsilon^2 \leq \delta_{THRESHOLD}.$$

19. The device of claim 12, where the processing unit is further configured to execute instructions in the memory to:
receive antenna port permutations for a plurality of antenna ports of the device;
receive expected information associated with the plurality of antenna ports;
calculate expected values for different antenna port permutations based on the received information;
acquire measured values associated with the different antenna port permutations,
compare the expected values for the different antenna port permutations with the measured values for the different antenna port permutations to determine errors for the different antenna port permutations; and
determine an optimal antenna port permutation to be one of the different antenna port permutations with the smallest determined error.

20. The device of claim 12, where the device comprises a base station.

21. The device of claim 12, where the device comprises a remote radio unit associated with a base station.

22. The device of claim 12, where the memory is further configured to store an expected value table comprising the expected parameter.

* * * * *

UNITED STATES PATENT AND TRADEMARK OFFICE
CERTIFICATE OF CORRECTION

PATENT NO. : 8,670,722 B2  
APPLICATION NO. : 13/321076  
DATED : March 11, 2014  
INVENTOR(S) : Miao et al.

Page 1 of 1

It is certified that error appears in the above-identified patent and that said Letters Patent is hereby corrected as shown below:

In the Specification

In Column 4, Line 26, delete "deter mined" and insert -- determined --, therefor.

In Column 9, Line 39, delete "port 300." and insert -- bank 300. --, therefor.

In Column 15, Line 67, delete "terns" and insert -- term --, therefor.

Signed and Sealed this
Twenty-sixth Day of August, 2014

Michelle K. Lee
*Deputy Director of the United States Patent and Trademark Office*